July 21, 1925.

O. SWANSON

PRESSURE GAUGE HOLDER

Filed Dec. 15, 1923

Inventor
Olof Swanson.
By A. J. O'Brien
Attorney

Patented July 21, 1925.

1,546,951

UNITED STATES PATENT OFFICE.

OLOF SWANSON, OF DENVER, COLORADO.

PRESSURE-GAUGE HOLDER.

Application filed December 13, 1923. Serial No. 680,562.

*To all whom it may concern:*

Be it known that I, OLOF SWANSON, a citizen of the United States, residing at Denver, in the city and county of Denver and State of Colorado, have invented certain new and useful Improvements in Pressure-Gauge Holders; and I do declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to pressure gauge holders of the type employed in connection with steam power plants.

On locomotives and other steam power plants it is essential that the pressure gauges employed shall correctly indicate the pressure of the steam. In order that the correctness of the gauge indications shall be beyond question, the law as well as common prudence requires that the gauge shall be removed and tested at stated intervals of about three months.

It is the object of this invention to produce a gauge holder that can be permanently connected to a locomotive or boiler setting, and to which the gauge can be applied and from which it can be readily removed. It is a further object of this invention to produce a holder that can be employed in connection with gauges of different sizes and which will hold the gauge firmly and prevent it from loosening when subjected to vibrations.

In order better and more clearly to describe my invention, I shall have reference to the accompanying drawing in which the preferred embodiment of my invention is shown, and in which.

The same reference characters will be used to designate the same parts throughout the several views.

Figure 1:
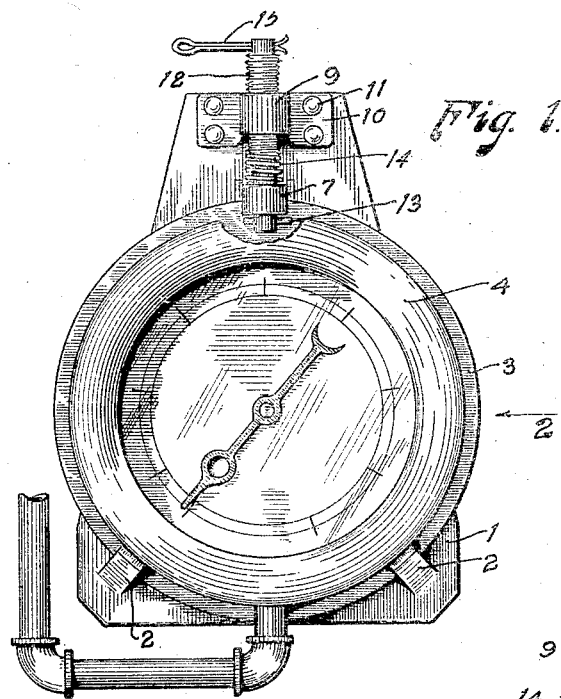
Fig. 1 is a plan view of my improved holder with a gauge secured thereto and held in place thereby.
Figure 2:
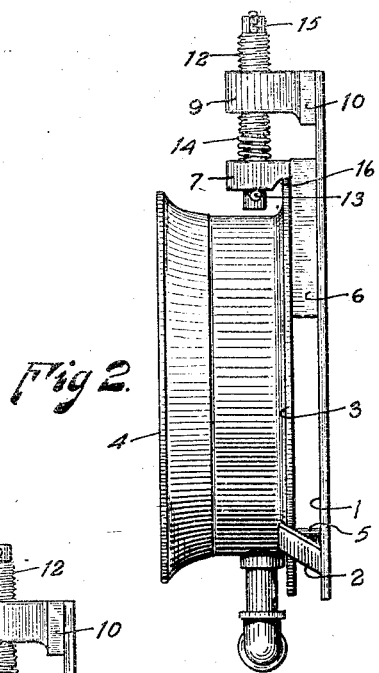
Fig. 2 is a side elevation looking in the direction of arrow 2, Fig. 1.
Figure 3:
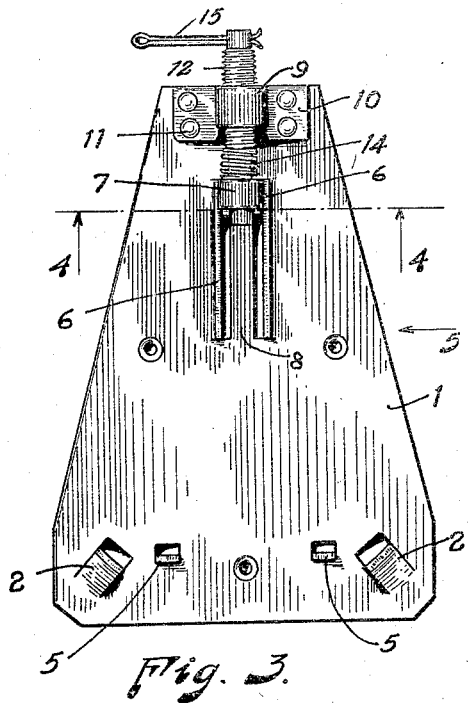
Fig. 3 is a plan view of the holder with the gauge removed therefrom.
Figure 4:
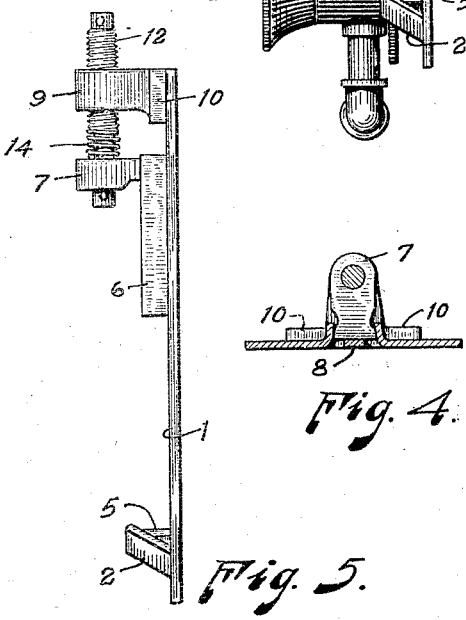
Fig. 4 is a section taken on line 4—4, Fig. 3.
Figure 5:
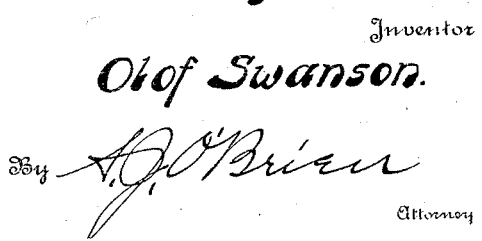
Fig. 5 is a side elevation of the holder, looking in the direction of arrow 5, Fig. 3.

My holder comprises a plate 1 shaped somewhat in the form of a truncated isosceles triangle. Near each base angle I provide outwardly inclined lips 2, which are cut from the material of the plate and are adapted to receive the flange 3 of the gauge 4. Lugs 5 are cut from the plate and bent outwardly. These lugs serve as supports for the gauge and spaces the latter from the face of the bracket. Near the vertex of the triangle, I cut two ribs 6 from the plate and bend the same outwardly so as to form guides for the lug 7. A portion of the plate, designated by numeral 8, is left between the ribs 6 and serves as a guide for the bottom of the lug 7. A member 9, which may be a casting or a forging, is provided at its base with two lugs 10, by means of which it is secured to the plate by rivets 11 or other similar means. The member 9 is provided with a threaded opening for the reception of the bolt 12, one end of which is rotatably connected to the lug 7 and provided with a transverse pin 13. A helical compression spring 14 surrounds bolt 12 and is located thereon between parts 7 and 9. The upper end of bolt 12 has a transverse pin 15, which serves as a handle for rotating the bolt. The lower side of lug 7 has a notch 16 with which the flange 3 of the gauge 4 engages.

When the gauge is to be put into place, the bolt 12 is rotated in such a direction that lug 7 will move upwardly. The gauge is put into place with flange 3 engaging lips 2 and resting on lugs 5 and flanges 6. The bolt 12 is now rotated in the opposite direction, which permits the spring 14 to move lug 7 downwardly against the flange 3 and thereby firmly secure the gauge in place. The spring 14 is always under compression and serves to maintain sufficient friction between the bolt and the threaded member 9 to prevent the bolt from unscrewing when the holder is subjected to constant vibration, as it will be on a locomotive.

Since the range of movement of member 7 may be considerable, it is evident that the holder is adapted to be employed with gauges of different sizes.

From the above it is apparent that I have produced a holder that is of simple construction and which can be cheaply made.

It will accommodate gauges of varying sizes and is provided with friction-producing means that prevent the bolt 12 from turning when subjected to vibration.

Having now described my invention, what I claim as new is:

1. A gauge-holder comprising a plate adapted to be secured in vertical position on a wall, said plate having a pair of lugs near its lower end, the inner surfaces of said lugs being spaced from the plate and inclined upwardly and outwardly with respect to the plane of the plate so as to engage and hold a flange, a pair of vertically arranged parallel spaced guiding ribs near the upper end of the plate, said ribs extending outwardly from the plate and having their adjacent sides inclined towards each other, a lug slidably mounted between said ribs so as to be guided thereby, means comprising a threaded bolt for moving said lug upwardly, and means comprising said bolt and a spring for moving the lug downwardly.

2. A gauge-holder comprising a plate of substantially triangular shape, a pair of lugs formed integral with the plate and having their inner surfaces upwardly and outwardly inclined with respect to the plate, said lugs being located near the base angles of said plate, a pair of guide ribs near the vertex of said plate, said ribs being parallel and inclined towards each other, a lug projecting outwardly from the plane of the plate near the vertex thereof, a lug having one end slidably mounted between said ribs, a bolt threadedly connected to the outwardly projecting lug, and having one end rotatably connected to the slidable lug, and a spring on said bolt having one end in frictional engagement with the slidable lug.

3. A gauge-holder comprising a plate of substantially triangular shape, a pair of lugs formed integral with the plate and having their inner surfaces upwardly and outwardly inclined with respect to the plane thereof, said lugs being located near the base angles of said plate, a lug projecting outwardly from the plate near the vertex thereof, a bolt threadedly connected to the lug, a guideway on the plate, said guideway extending in a direction parallel with the bolt, the walls of said guideway being inclined towards each other so as to form a dovetail slot, a lug slidable in said slot, said slidable lug having an opening for the reception of the end of the bolt, and a spring on the bolt, said spring engaging one side of said lug and a shoulder on the bolt.

4. A gauge-holder comprising a plate of substantially triangular shape, adapted to be secured in vertical position on a wall, a pair of lugs near the base angles of said plate, the inner surface of said lugs being spaced from the plate and inclined upwardly and outwardly with respect to the face of the plate so as to be adapted to engage and hold a flange on a pressure gauge, guide means located below the vertex of said plate, a lug having means cooperating with the guide and adapted to be moved along the latter, a lug projecting outwardly from the surface of the plate near the vertex of the plate, a bolt threadedly connected to the outwardly projecting lug and having one end rotatably connected with a slidable lug, said bolt having a portion near its end of decreased diameter whereby a shoulder is formed and a helical compression spring between the first mentioned lug and said shoulder.

In testimony whereof I affix my signature.

OLOF SWANSON.